United States Patent
Tran et al.

(10) Patent No.: US 12,327,409 B2
(45) Date of Patent: Jun. 10, 2025

(54) SYSTEM AND METHOD FOR DETERMINING SUB-ACTIVITIES IN VIDEOS AND SEGMENTING THE VIDEOS WITH LITTLE TO NO ANNOTATION

(71) Applicant: Retrocausal, Inc., Redmond, WA (US)

(72) Inventors: Quoc-Huy Tran, Redmond, WA (US); Muhammad Zeeshan Zia, Sammamish, WA (US); Andrey Konin, Redmond, WA (US); Sateesh Kumar, La Jolla, CA (US); Sanjay Haresh, Burnaby (CA); Awais Ahmed, Karachi (PK); Hamza Khan, Karachi (PK); Muhammad Shakeeb Hussain Siddiqui, Karachi (PK)

(73) Assignee: Retrocausal, Inc., WA (US)

( * ) Notice: Subject to any disclaimer, the term of this patent is extended or adjusted under 35 U.S.C. 154(b) by 638 days.

(21) Appl. No.: 17/752,946

(22) Filed: May 25, 2022

(65) Prior Publication Data

US 2022/0383638 A1 Dec. 1, 2022

Related U.S. Application Data

(60) Provisional application No. 63/192,923, filed on May 25, 2021.

(51) Int. Cl.
*G06V 20/40* (2022.01)
*G06V 10/62* (2022.01)
*G06V 10/762* (2022.01)

(52) U.S. Cl.
CPC ........... *G06V 20/49* (2022.01); *G06V 10/62* (2022.01); *G06V 10/762* (2022.01); *G06V 20/41* (2022.01)

(58) Field of Classification Search
CPC ...... G06V 20/49; G06V 10/762; G06V 20/41; G06V 10/62
See application file for complete search history.

(56) References Cited

U.S. PATENT DOCUMENTS

| | | | |
|---|---|---|---|
| 2013/0208814 A1* | 8/2013 | Argyropoulos .. | H04N 21/43072 375/240.27 |
| 2018/0137389 A1* | 5/2018 | Mathieu ............... | G06V 10/454 |
| 2021/0279950 A1* | 9/2021 | Phalak ................... | G06T 7/55 |
| 2022/0121884 A1* | 4/2022 | Zadeh ................... | G06N 3/006 |

* cited by examiner

*Primary Examiner* — Margaret G Webb
(74) *Attorney, Agent, or Firm* — Jason C. Cameron

(57) ABSTRACT

A system and method for determining sub-activities in videos and segmenting the videos is disclosed. The method includes extracting one or more batches from one or more videos and extracting one or more features from set of frames associated with the one or more batches. The method further includes generating a set of predicted codes and determining a cross-entropy loss, temporal coherence loss and a final loss. Further, the method includes categorizing the set of frames into one or more predefined clusters and generating one or more segmented videos based on the categorized set of frames, the determined final loss, and the set of predicted codes by using s activity determination-based ML model. The method includes outputting the generated one or more segmented videos on user interface screen of one or more electronic devices associated with one or more users.

20 Claims, 8 Drawing Sheets

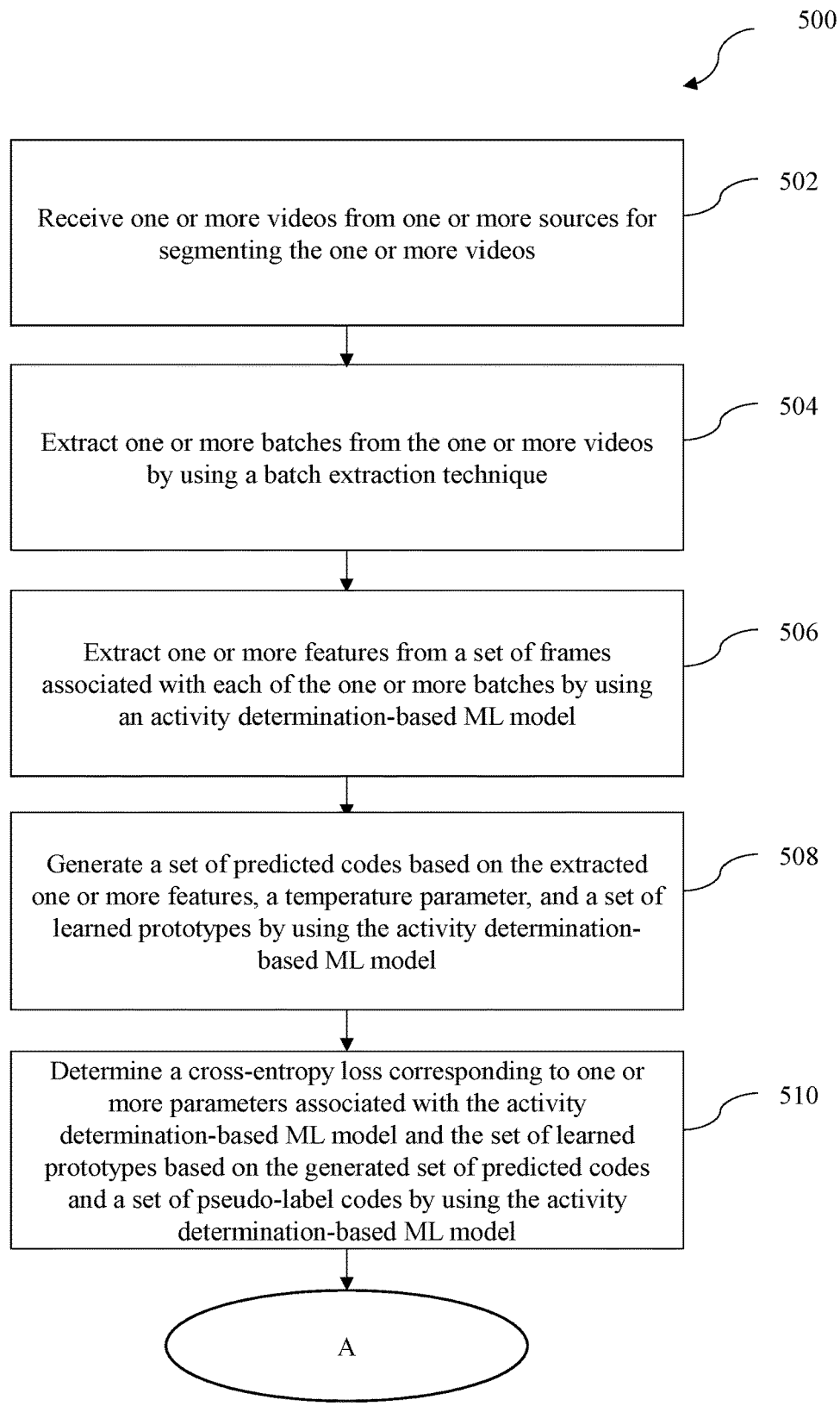
FIG. 5 (contd)

SYSTEM AND METHOD FOR DETERMINING SUB-ACTIVITIES IN VIDEOS AND SEGMENTING THE VIDEOS WITH LITTLE TO NO ANNOTATION

CROSS-REFERENCE TO RELATED APPLICATIONS

This application is a complete specification of U.S. provisional patent application No. 63/192,923 titled "SYSTEM AND METHOD FOR TEMPORALLY SEGMENTING VIDEOS AND DISCOVERING SUB-ACTIVITIES FROM VIDEOS OF A HUMAN ACTIVITY" filed on May 25, 2021 with the United States Patent and Trademark Office.

FIELD OF INVENTION

Embodiments of the present disclosure relate to video processing systems and more particularly relate to a system and method for determining sub-activities in videos and segmenting the videos.

BACKGROUND

Currently, multiple organizations record videos of their internal processes, such as a worker assembling a car door in an automobile factory, a nurse performing a Focused Assessment with Sonography in Trauma (FAST) procedure on a patient in a hospital and the like, to leverage the recorded videos for multiple tasks. For example, the multiple tasks may be documentation, training, analytics, task guidance, quality assurance, compliance, improvement purposes and the like. However, to leverage the videos for the multiple tasks, it is often required to fully annotate the videos, i.e., by defining action or sub-activity classes of interest and temporally segmenting the videos where each frame of a video is associated with one of the action or the sub-activity classes specifically. Further, the annotated videos are used for training machine learning or deep learning models for different applications, such as live feedback for workers at their workstations. Thus, existing approach requires a human to first define steps in an activity, and then label the steps in a video dataset at a level of time stamps. Thus, the existing approach requires manual effort from humans and hinder autonomous monitoring of previously unmodeled activities.

Conventionally, there are multiple solutions for unsupervised activity segmentation. For example, an iterative approach is used which alternates between learning a discriminative appearance model and optimizing a generative temporal model of the activity. Further, a multi-step approach is also used which includes learning a temporal embedding and performing K-means clustering on learned features. With the advancements in technology, the multi-step approach is further improved by learning a visual embedding and an action-level embedding respectively. However, all these conventional approaches usually separate a representation learning step from a clustering step in a sequential learning and clustering framework, which prevents feedback from the clustering step from flowing back to the representation learning step. Also, they require to store computed features for a whole dataset before clustering them in an offline manner, leading to memory inefficiency. Furthermore, another conventional approach proposes a joint representation learning and clustering approach. However, this approach uses discriminative learning for clustering, and uses reconstruction loss for representation learning, which leads to inferior performance. Also, more complex encoder is required in this approach.

Hence, there is a need for an improved system and method for determining sub-activities in videos and segmenting the videos, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for determining sub-activities in videos and segmenting the videos. The computing system includes one or more hardware processors and a memory coupled to the one or more hardware processors. The memory includes a plurality of modules in the form of programmable instructions executable by the one or more hardware processors. The plurality of modules include a data receiver module configured to receive one or more videos from one or more sources for segmenting the one or more videos. The one or more videos are unlabeled videos including one or more activities performed by a human. The plurality of modules also include a batch extraction module configured to extract one or more batches from the received one or more videos by using a batch extraction technique. Each of the one or more batches includes a set of frames. The plurality of modules includes a feature extraction module configured to extract one or more features from the set of frames associated with each of the one or more batches by using an activity determination-based Machine Learning (ML) model. Further, the plurality of modules include a predicted code generation module configured to generate a set of predicted codes based on the extracted one or more features, a temperature parameter, and a set of learned prototypes by using the activity determination-based ML model. Each of the set of learned prototypes corresponds to a cluster center. The plurality of modules also include a cross-entropy loss determination module configured to determine a cross-entropy loss corresponding to one or more parameters associated with the activity determination-based ML model and the set of learned prototypes based on the generated set of predicted codes and a set of pseudo-label codes by using the activity determination-based ML model. Furthermore, the plurality of modules include a temporal coherence loss determination module configured to determine a temporal coherence loss corresponding to the one or more parameters based on a subset of frames associated with the set of frames, a positive sample of frames, a negative sample of frames and the one or more parameters by using the activity determination-based ML model upon determining the temporal coherence loss. The plurality of modules include a loss determination module configured to determine a final loss based on the determined cross-entropy loss, the determined temporal coherence loss and a weight associated with the determined temporal coherence loss by using the activity determination-based ML model. The final loss is optimized corresponding to the one or more parameters and the set of learned prototypes. The plurality of modules include a data categorization module configured to categorize the set of frames into one or more predefined clusters based on the extracted one or more features, the determined final loss, the set of predicted codes and the set of learned prototypes by using the activity determination-based ML model. Each of the one or more predefined clusters corresponds to a sub-activity. Further the plurality of modules include a data generation module configured to generate one or more segmented videos based on the categorized set of frames, the determined final loss and the set of predicted codes by using the activity determination-based ML model. The plurality of modules include a data output module configured to output the generated one or more segmented videos on user interface screen of one or more electronic devices associated with one or more users.

In accordance with another embodiment of the present disclosure, a method for determining sub-activities in videos and segmenting the videos is disclosed. The method includes receiving one or more videos from one or more sources for segmenting the one or more videos. The one or more videos are unlabelled videos including one or more activities performed by a human. The method also includes extracting one or more batches from the received one or more videos by using a batch extraction technique. Each of the one or more batches comprises a set of frames. The method further includes extracting one or more features from the set of frames associated with each of the one or more batches by using an activity determination-based Machine Learning (ML) model. Further, the method includes generating a set of predicted codes based on the extracted one or more features, a temperature parameter, and a set of learned prototypes by using the activity determination-based ML model. Each of the set of learned prototypes corresponds to a cluster center. Also, the method includes determining a cross-entropy loss corresponding to one or more parameters associated with the activity determination-based ML model and the set of learned prototypes based on the generated set of predicted codes and a set of pseudo-label codes by using the activity determination-based ML model. Further, the method includes determining a temporal coherence loss corresponding to the one or more parameters based on a subset of frames associated with the set of frames, a positive sample of frames, a negative sample of frames and the one or more parameters by using the activity determination-based ML model upon determining the temporal coherence loss. The method includes determining a final loss based on the determined cross-entropy loss, the determined temporal coherence loss and a weight associated with the determined temporal coherence loss by using the activity determination-based ML model. The final loss is optimized corresponding to the one or more parameters and the set of learned prototypes. The method includes categorizing the set of frames into one or more predefined clusters based on the extracted one or more features, the determined final loss, the set of predicted codes and the set of learned prototypes by using the activity determination-based ML model. Each of the one or more predefined clusters corresponds to a sub-activity. Furthermore, the method includes generating one or more segmented videos based on the categorized set of frames, the determined final loss and the set of predicted codes by using the activity determination-based ML model. The method includes outputting the generated one or more segmented videos on user interface screen of one or more electronic devices associated with one or more users.

Embodiment of the present disclosure also provide a non-transitory computer-readable storage medium having instructions stored therein that, when executed by a hardware processor, cause the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
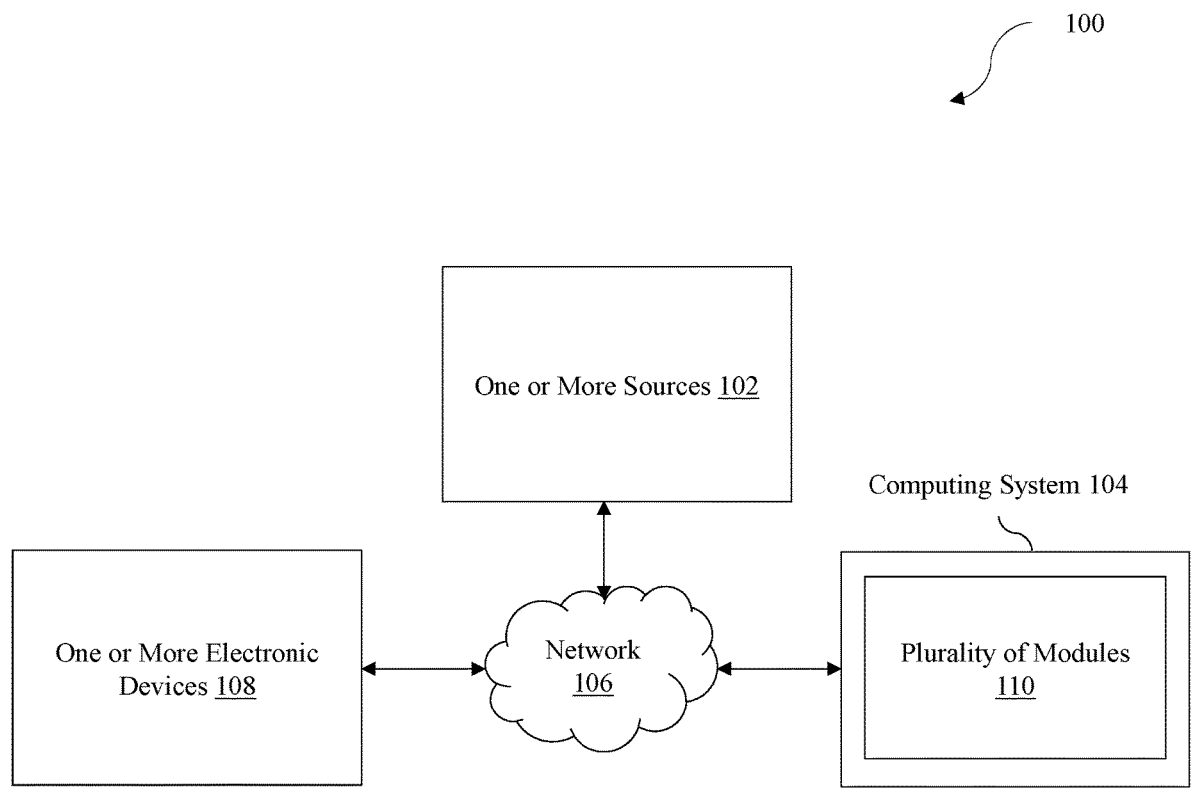
FIG. 1 is a block diagram illustrating an exemplary computing environment for determining sub-activities in videos and segmenting the videos, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for determining sub-activities in videos and segmenting the videos, in accordance with an embodiment of the present disclosure. According to FIG. 1, the computing environment 100 includes one or more sources 102 communicatively coupled to a computing system 104 via a network 106. In an embodiment of the present disclosure, the one or more sources 102 are configured to share one or more videos to the computing system 104. In an embodiment of the present disclosure, the one or more videos are unlabeled videos including one or more activities performed by a human. For example, the one or more activities may be a worker assembling a car door in an automobile factory, a nurse performing a Focused Assessment with Sonography in Trauma (FAST) procedure on a patient in a hospital and the like. In an exemplary embodiment of the present disclosure, the one or more sources 102 may be one or more image capturing devices, one or more electronic devices 108 and the like. In an embodiment of the present disclosure, the one or more sources 102 may capture the one or more videos, store the one or more videos and the like. In an embodiment of the present disclosure, the computing system 104 may be hosted on a central server, such as cloud server or a remote server. Further, the network 106 may be internet or any other wireless network.

Further, the computing environment 100 includes the one or more electronic devices 108 associated with one or more users communicatively coupled to the computing system 104 via the network 106. The one or more electronic devices 108 are used by the one or more users to receive one or more segmented videos. In an exemplary embodiment of the present disclosure, the one or more electronic devices 108 may include a laptop computer, desktop computer, tablet computer, smartphone, wearable device, smart watch and the like.

Furthermore, the one or more electronic devices 108 include a local browser, a mobile application or a combination thereof. Furthermore, the one or more users may use a web application via the local browser, the mobile application or a combination thereof to communicate with the computing system 104. In an embodiment of the present disclosure, the computing system 104 includes a plurality of modules 110. Details on the plurality of modules 110 have been elaborated in subsequent paragraphs of the present description with reference to FIG. 2.

In an embodiment of the present disclosure, the computing system 104 is configured to receive the one or more videos from the one or more sources 102 for segmenting the one or more videos. Further, the computing system 104 extracts one or more batches from the received one or more videos by using a batch extraction technique. In an embodiment of the present disclosure, each of the one or more batches includes a set of frames. The computing system 104 extracts one or more features from the set of frames associated with each of the one or more batches by using an activity determination-based Machine Learning (ML) model. The computing system 104 generates a set of predicted codes based on the extracted one or more features, a temperature parameter, and a set of learned prototypes by using the activity determination-based ML model. The computing system 104 determines a cross-entropy loss corresponding to one or more parameters associated with the activity determination-based ML model and the set of learned prototypes based on the generated set of predicted codes and a set of pseudo-label codes by using the activity determination-based ML mode. Furthermore, the computing system 104 determines a temporal coherence loss corresponding to the one or more parameters based on a subset of frames associated with the set of frames, a positive sample of frames, a negative sample of frames and the one or more parameters by using the activity determination-based ML model upon determining the temporal coherence loss. The computing system 104 determines a final loss based on the determined cross-entropy loss, the determined temporal coherence loss and a weight associated with the determined temporal coherence loss by using the activity determination-based ML model. In an embodiment of the present disclosure, the final loss is optimized corresponding to the one or more parameters and the set of learned prototypes. The computing system 104 categorizes the set of frames into one or more predefined clusters based on the extracted one or more features, the determined final loss, the set of predicted codes and the set of learned prototypes by using the activity determination-based ML model. In an embodiment of the present disclosure, each of the one or more predefined clusters corresponds to a sub-activity. Further, the computing system 104 generates one or more segmented videos based on the categorized set of frames, the determined final loss and the set of predicted codes by using the activity determination-based ML model. The computing system 104 outputs the generated one or more segmented videos on user interface screen of the one or more electronic devices 108 associated with the one or more users.

Figure 2:
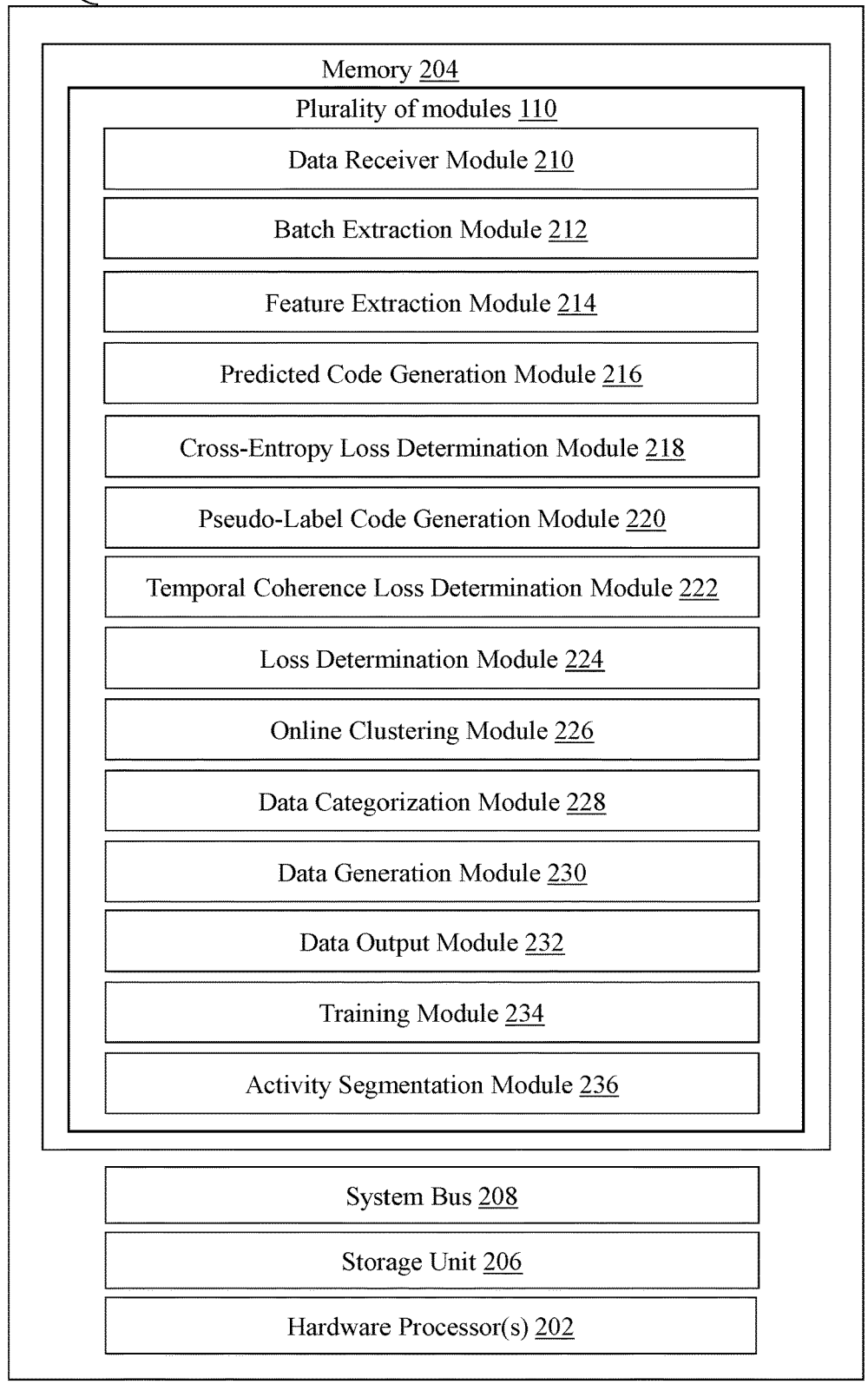
FIG. 2 is a block diagram illustrating an exemplary computing system for determining sub-activities in the videos and segmenting the videos, in accordance with an embodiment of the present disclosure.

FIG. 2 is a block diagram illustrating an exemplary computing system 104 for analyzing businesses data to make business decisions, in accordance with an embodiment of the present disclosure. Further, the computing system 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 110 in the form of programmable instructions executable by the one or more hardware processors 202. Further, the plurality of modules 110 includes a data receiver module 210, a batch extraction module 212, a feature extraction module 214, a predicted code generation module 216, a cross-entropy loss determination module 218, a pseudo-label code generation module 220, a temporal coherence loss determination module 222, a loss determination module 224, an online clustering module 226, a data categorization module 228, a data generation module 230, a data output module 232, a training module 234 and an activity segmentation module 236.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 110 stored in the form of machine-readable instructions on any of the above-mentioned storage media and may be in communication with and executed by the one or more hardware processors 202.

The storage unit 206 may be a cloud storage. The storage unit 206 may store the received one or more videos, the one or more batches, the set of predicted codes, the one or more features, the temperature parameter, a set of learned prototypes, the cross-entropy loss, the one or more parameters and the temporal coherence loss. The storage unit may also store the positive sample of frames, the negative sample of frames, the final loss, the one or more segmented videos, one or more dense framewise labels, a classification loss, a smoothing loss, a confident loss, and the like.

The data receiver module 210 is configured to receive the one or more videos from the one or more sources 102 for segmenting the one or more videos. In an embodiment of the present disclosure, the one or more sources 102 are configured to share the one or more videos with the computing system 104. In an embodiment of the present disclosure, the one or more videos are unlabeled videos including one or more activities performed by a human. The one or more activities may be complex human activities. For example, the one or more activities may be a worker assembling a car door in an automobile factory, a nurse performing a Focused Assessment with Sonography in Trauma (FAST) procedure on a patient in a hospital and the like. In an exemplary embodiment of the present disclosure, the one or more sources 102 may be one or more image capturing devices, one or more electronic devices 108 and the like. In an embodiment of the present disclosure, the one or more sources 102 may capture the one or more videos, store the one or more videos and the like. In an exemplary embodiment of the present disclosure, the one or more electronic devices 108 may include a laptop computer, desktop computer, tablet computer, smartphone, wearable device, smart watch and the like.

The batch extraction module 212 is configured to extract the one or more batches from the received one or more videos by using the batch extraction technique. For example, each batch contains 64 frames collected from two videos. In an embodiment of the present disclosure, each of the one or more batches includes a set of frames.

The feature extraction module 214 is configured to extract one or more features from the set of frames associated with each of the one or more batches by using an activity determination-based ML model. For example, the activity determination-based ML model is a deep neural network. In an embodiment of the present disclosure, the one or more features include one or more geometric features and one or more semantic features. For example, the one or more geometric features include edges, corners extracted the set of frames and the like. Further, the one or more semantic features include object classes, object poses extracted from the set of frames and the like.

The predicted code generation module 216 is configured to generate the set of predicted codes based on the extracted one or more features, the temperature parameter, and the set of learned prototypes by using the activity determination-based ML model. In an embodiment of the present disclosure, each of the set of learned prototypes corresponds to a cluster center. In an embodiment of the present disclosure, each of the cluster centre corresponds to a sub-activity. In generating the set of predicted codes based on the extracted one or more features, the temperature parameter, and the set of learned prototypes by using the activity determination-based ML model, the predicted code generation module 216 correlates the extracted one or more features, the temperature parameter, and the set of learned prototypes with each other by using the activity determination-based ML model.

Further, the predicted code generation module 216 generates the set of predicted codes based on result of correlation. In an embodiment of the present disclosure, the set of predicted codes facilitates in associating the set of frames with the one or more predefined clusters. Further, the set of predicted codes with each entry are computed as:

$$P_{ij} = \exp(1/\tau z_i^T c_j) / \Sigma_{j'=1}^{K} \exp(1/\tau z_i^T c_{j'})  \quad \text{equation(1)}$$

In an embodiment of the present disclosure, $P_{ij}$ represents probability that an i-th frame/feature $z_i$ is assigned to a j-th cluster/prototype $c_j$, 'P' represents the set of predicted codes (predicted assignment probabilities between frames/features and clusters/prototypes) and 'τ' represents the temperature parameter. 'K' is the number of clusters/prototypes in an activity.

The cross-entropy loss determination module 218 is configured to determine the cross-entropy loss corresponding to one or more parameters associated with the activity determination-based ML model and the set of learned prototypes based on the generated set of predicted codes and the set of pseudo-label codes by using the activity determination-based ML model. Further, for clustering-based representation learning, the cross-entropy loss is minimized with respect to the one or more parameters and the set of learned prototypes:

$$L_{CE} = -1/B \Sigma_{i=1}^{B} \Sigma_{j=1}^{K} Q_{ij} \log P_{ij} \qquad \text{equation(2)}$$

Furthermore, Q represents the set of pseudo-label codes (pseudo-label assignment probabilities between frames/features and clusters/prototypes) and $L_{CE}$ represents the cross-entropy loss. B is the number of frames/features in a data batch.

In an embodiment of the present disclosure, the pseudo-label code generation module 220 is configured to determine a probability for mapping each of the extracted one or more features with the set of learned prototypes. Further, the pseudo-label code generation module 220 determines a similarity between the extracted one or more features and the set of learned protypes by using a temporal optimal transport problem. In an embodiment of the present disclosure, the temporal optimal transport problem exploits temporal information in the one or more videos. The pseudo-label code generation module 220 generates the set of pseudo-label codes by using the temporal optimal transport problem. Furthermore, the pseudo-label code generation module 220 generates the set of pseudo-label codes based on the extracted one or more features, the set of learned prototypes, the determined similarity, and the temporal prior by using the activity determination-based ML model. In an embodiment of the present disclosure, the set of pseudo-label codes acts as a ground truth associations between the set of frames and the one or more predefined clusters. Further, the set of pseudo-label codes are computed by solving the temporal optimal transport problem by using a predefined data batch at a time.

The temporal coherence loss determination module 222 is configured to determine the temporal coherence loss corresponding to the one or more parameters based on a subset of frames associated with the set of frames, the positive sample of frames, the negative sample of frames and the one or more parameters by using the activity determination-based ML model upon determining the temporal coherence loss. In an embodiment of the present disclosure, the temporal coherence loss is a self-supervised loss which exploits temporal information in the one or more videos. The temporal coherence loss learns an embedding space following temporal coherence constraints, where temporally close frames may be mapped with nearby points and temporally distant frames should be mapped with far away points. To enable fast convergence and effective representations, N-pair metric learning loss is employed.

Further, the temporal coherence loss is minimized with respect to the one or more parameters:

$$L_{TC} = -1/N \Sigma_{i=1}^{N} \log[\exp(z_i^T z_i^+)/(\exp(z_i^T z_i^+) + \Sigma_{j \neq i}^{N} \exp(z_i^T z_j^+))] \qquad \text{equation(3)}$$

In an embodiment of the present disclosure, $L_{TC}$ represents the temporal coherence loss. Further, for each of the one or more videos, a subset of N ordered frames are sampled and denoted by $\{z_i\}$, with $i \in \{1, 2, \ldots, N\}$. For each $z_i$, a "positive" example $z_i^+$ is sampled inside a temporal window of $\lambda$ from $z_i$. Moreover, $z_j^+$ sampled for $z_j$ (with $j \neq i$) is considered as a "negative" example for $z_i$.

The loss determination module 224 is configured to determine the final loss based on the determined cross-entropy loss, the determined temporal coherence loss and a weight associated with the determined temporal coherence loss by using the activity determination-based ML model. In an embodiment of the present disclosure, the final loss is optimized corresponding to the one or more parameters and the set of learned prototypes. In an embodiment of the present disclosure, the final loss for learning self-supervised representations for unsupervised activity segmentation is a combination of the determined cross-entropy loss and the determined temporal coherence loss:

$$L = L_{CE} + \alpha L_{TC} \qquad \text{equation(4)}$$

In an embodiment of the present disclosure, α represents the weight for the temporal coherence loss and L represents the final loss. In an embodiment of the present disclosure, the final loss is optimized with respect to the one or more parameters and the set of learned prototypes. The cross-entropy loss and the temporal coherence loss are differentiable and may be optimized using backpropagation. In an embodiment of the present disclosure, the set of pseudo-label codes are not used for propagation. Furthermore, although the focus is on exploiting temporal/frame-level cues in videos, this approach can easily be extended to include additional losses for exploiting additional cues such as spatial cues, action-level cues, and alignment cues.

In an embodiment of the present disclosure, an online clustering module 226 is used for computing the set of pseudo-label codes online. In an embodiment of the present disclosure, after extracting the one or more features from the set of frames, the set of pseudo-label codes are computed with each entry $Q_{ij}$ representing probability that features $z_i$ may be mapped to the prototype $c_j$. In an embodiment of the present disclosure, the set of pseudo-label codes are computed by solving the optimal transport problem:

$$\max_{Q \in Q} Tr(Q^T Z C^T) + \varepsilon H(Q) \qquad \text{equation(5)}$$

$$Q = \{Q \in R_+^{B \times K} : Q1_K = 1/B 1_B, Q1_B = 1/K 1_K\} \qquad \text{equation(6)}$$

In an embodiment of the present disclosure, Q represents the set of pseudo-label codes, Tr( ) represents the trace( ) operator, Z represents the set of frame features and C represents the set of learned prototypes. Further, $1_B$ and $1_K$ denote vectors of ones in dimensions B and K respectively. In equation (5), the first term i.e., Tr ($Q^T$ Z $C^T$) measures the similarity between the one or more features and the set if learned prototypes, while the second term i.e., H(Q)=−$\Sigma_{i=1} \Sigma_{j=1}^{K} Q_{ij} \log Q_{ij}$) measures entropy regularization of the set of pseudo-label codes and is the weight for the entropy term. A large value of E usually leads to a trivial solution where every frame has the same probability of being assigned to every cluster. Thus, a small value of E is used in experiments to avoid the above trivial solution. Furthermore, equation (6) represents equal partition constraints, which enforce that each cluster is assigned the same number of frames in a batch, thus preventing a trivial solution where all frames are assigned to a single cluster.

Further, a temporal regularization term is incorporated which preserves the temporal order of the activity into the optimal transport objective in equation (5), yielding the temporal optimal transport. Furthermore, a prior distribution for Q, namely:

$$T \in R_+^{B \times K} \qquad \text{equation(7)}$$

In an embodiment of the present disclosure, the highest values appear on the diagonal and the values gradually decrease along the direction perpendicular to the diagonal. Specifically, T maintains a fixed temporal order of the clusters and enforces initial frames to be assigned to initial clusters and later frames to be assigned to later clusters. Mathematically, T may be represented by a 2D distribution, whose marginal distribution along any line perpendicular to the diagonal is a Gaussian distribution centered at the intersection on the diagonal, as:

$$T_{ij}=1/(\sigma sqrt(2\pi))exp(-d^2(i,j)/(2\sigma^2)), d(i,j)=|i/B-j/K|/sqrt(1/B^2+1/K^2) \quad \text{equation(8)}$$

In an embodiment of the present disclosure, with $d(i,j)$ measuring the distance from the entry $(i,j)$ to the diagonal line. To encourage the distribution of values of the set of pseudo-label codes to be as similar as possible to the above prior distribution T, the optimal transport objective in the equation (5) is replaced with the following temporal optimal transport objective:

$$\max_{Q \in Q} Tr(Q^T Z C^T) - \rho KL(Q\|T) \quad \text{equation(9)}$$

$$KL(Q\|T) = \Sigma_{i=1}^{B} \Sigma_{j=1}^{K} Q_{ij} \log(Q_{ij}/T_{ij}) \quad \text{equation(10)}$$

In an embodiment of the present disclosure, equation (10) is the Kullback-Leibler (KL) divergence between Q and T, and ρ is the weight for the KL term. Furthermore, the focus is on exploiting the above fixed temporal order prior T (also called temporal order-preserving prior), this approach can easily be extended to handle order variations (e.g., by using a combination of the fixed temporal order prior and the optimality prior), and background or redundant frames (e.g., by adding a virtual cluster for background/redundant frames).

The data categorization module 228 is configured to categorize the set of frames into one or more predefined clusters based on the extracted one or more features, the determined final loss, the set of predicted codes and the set of learned prototypes by using the activity determination-based ML model. In an embodiment of the present disclosure, each of the one or more predefined clusters corresponds to a sub-activity.

The data generation module 230 is configured to generate the one or more segmented videos based on the categorized set of frames, the determined final loss and the set of predicted codes by using the activity determination-based ML model. In an embodiment of the present disclosure, each of the one or more segmented videos corresponds to grouping of frames associated with same sub-activity in the one or more videos into one cluster. In an embodiment of the present disclosure, the activity determination-based ML model is an unsupervised activity segmentation model which requires only unlabeled videos i.e., without annotation to generate the one or more segmented videos.

The data output module 232 is configured to output the generated one or more segmented videos on user interface screen of the one or more electronic devices 108 associated with the one or more users.

The training module 234 applies the cross-entropy loss on the set of predicted codes and the generated set of pseudo-label codes for learning the one or more parameters of the activity determination-based ML model and the set of learned prototypes upon generating the set of pseudo-label codes. Further, the training module 234 maps a set of temporally close frames associated with the categorized set of frames to spatially nearby points in an embedding space and a set of temporally distant frames associated with the categorized set of frame to distant points in the embedding space by using the temporal coherence loss for learning the one or more parameters of the activity determination-based ML model.

In an embodiment of the present disclosure, the activity segmentation module 236 is configured to extract one or more framewise features from the received one or more videos by using a video segmentation-based ML model. In an embodiment of the present disclosure, the one or more framewise features comprise one or more geometric features and one or more semantic features. In an exemplary embodiment of the present disclosure, the video segmentation-based ML model is a deep neural network model. Further, the activity generation module predicts one or more sub-activity classes for the received one or more videos based on the extracted one or more framewise features by using the video segmentation-based ML model. The activity generation module generates the one or more segmented videos based on the predicted one or more sub activity classes by using the video segmentation-based ML model.

The training module 234 is configured to receive one or more sparse timestamp labels for one or more frames associated with the one or more videos from the one or more users. Further, the training module 234 trains a label prediction-based graph convolutional network model based on the extracted one or more framewise features, the received one or more sparse timestamp labels as supervision signals, a label generation loss and one or more propagation rules. In an embodiment of the present disclosure, the one or more propagation rules correspond to equation (11). The training module 234 generates one or more dense framewise labels based on the extracted one or more framewise features and the received one or more sparse timestamp labels by using the label prediction-based graph convolutional network model. The generated one or more dense framewise labels correspond to the one or more sub-activity classes predicted for the one or more framewise features. Furthermore, the training module 234 trains the video segmentation-based ML model by using an activity segmentation loss, and the received one or more sparse timestamp labels or the generated one or more dense framewise labels as supervision signals. In an embodiment of the present disclosure, the label prediction-based graph convolutional network model is learned in an end-to-end manner to exploit not only frame features but also connections between neighbouring frames. In an embodiment of the present disclosure, during training, the video segmentation-based ML model is initialized by training it with the one or more sparse timestamp labels i.e., initialization stage. Further, an alternating approach is used for training the label prediction-based graph convolutional network model, which takes framewise features from the video segmentation-based ML model as input, uses one or more sparse timestamp labels for supervision, and generates one or more dense framewise labels as output. Further, the alternating approach includes training the segmentation model, which uses the one or more dense framewise labels from the label prediction-based graph convolutional network model for supervision i.e., refinement stage. In an embodiment of the present disclosure, during testing, the label prediction-based graph convolutional network model is discarded while the video segmentation-based ML model is employed to provide segmentation results. In an exemplary embodiment of the present disclosure, the video segmentation-based ML model is multi-stage temporal convolutional network. Further, the label prediction-based graph convolutional network model is a two-layer graph convolutional network with below propagation rule:

$$H_{l+1}=\sigma(D'^{-1/2}A'D'^{-1/2}H_lW_l) \quad \text{equation}(11)$$

$$A'=A+I \quad \text{equation}(12)$$

In an embodiment of the present disclosure, A' is an adjacency matrix with added self-connections represented by an identity matrix I, while D' is the degree matrix of A'. Further, $W_l$, $\sigma$, and $H_l$ are the weight matrix, the activation function, and the activation matrix for the l-th layer respectively. In addition, the first layer maps input features i.e., 64-dimensional vectors to 32-dimensional vectors, which are subsequently passed through ReLU activation, a second layer, and lastly softmax classification. To construct a graph from an input video, frames are considered along with their features as nodes and we connect each frame with its preceding 15 frames and succeeding 15 frames i.e., yielding a temporal window size of 31, to form pairwise edges. Furthermore, the edge weight between nodes i and j are defined as cosine similarity between corresponding features $x_i$ and $x_j$ as:

$$A_{ij}=(x_i^T x_j)/(\|x_i\|\|x_j\|) \quad \text{equation}(13)$$

In an embodiment of the present disclosure, input features to the label prediction-based graph convolutional network model are the output of penultimate layer of the video segmentation-based ML model and are 64-dimensional vectors. The video segmentation-based ML model and the label prediction-based graph convolutional network model are learned via backpropagation respectively through losses determined by the loss determination module 224.

In an embodiment of the present disclosure, the loss determination module 224 is configured to predict a probability of assigning each of the set of frames to the predicted one or more sub-activity classes. Further, the loss determination module 224 determines a classification loss based on number of the set of frames, the predicted probability and the generated one or more dense framewise labels. The loss determination module 224 determines a smoothing loss based on number of the one or more sub-activity classes and a thresholding parameter upon determining the classification class. The loss determination module 224 determines a confident loss based on one or more timestamps associated with the set of frames, one or more action labels associated with the one or more timestamps, the predicted probability and number of frames contributing to loss upon determining the smoothing loss. Furthermore, the loss determination module 224 generates the label generation loss based on the determined classification loss, the determined smoothing loss and a smoothing weight associated with the determined smoothing loss. The loss determination module 224 generates the activity segmentation loss based on the determined classification loss, the determined smoothing loss, the determined confident loss, a confident weight associated with the determined confident loss and the smoothing weight. In an embodiment of the present disclosure, conventional combination of the classification loss and the smoothing loss for training the video segmentation-based ML model and the label prediction-based graph convolutional network model. Further, the confidence loss is used in the training of the video segmentation-based ML model to boost its performance.

In an embodiment of the present disclosure, the cross-entropy loss is applied between the predicted probabilities and the one or more action labels as:

$$L_{class}=1/T\Sigma_t(-\log y'_{t,a}) \quad \text{equation}(14)$$

In an embodiment of the present disclosure, T represents the number of frames in the video, $L_{class}$ is the classification loss, and $y'_{t,a}$ represents the predicted probability that frame $x_t$ is assigned to action class 'a'. In an embodiment of the present disclosure, the smoothing loss is employed to tackle the problem of over-segmentation as:

$$L_{smooth}=1/(TC)\Sigma_{t,a}(\Delta'_{t,a}{}^2), \Delta'_{t,a}=\Delta_{t,a}, \Delta_{t,a}<=\tau, \Delta'_{t,a}=\tau, \Delta_{t,a}>\tau, \Delta_{t,a}=|\log(y'_{t,a})-\log(y'_{t-1,a})| \quad \text{equation}(15)$$

Further, C represents a number of action classes in the activity, $L_{smooth}$ is the smoothing loss and $\tau$ represents a thresholding parameter. In an embodiment of the present disclosure, the confidence loss is adopted to encourage the predicted probabilities to monotonically decrease as the distance to the timestamps increases:

$$L_{conf}=1/T\Sigma_{ati\in ATS}(\Sigma_{t=ti-1}^{ti+1}\delta_{ati,t}), \delta_{ati,t}=\max(0,\log(y'_{t,ati})-\log(y'_{t-1,ati})), t<=t_i, \delta_{ati,t}=\max(0,\log(y't-1,ati)-\log(y't,ati)), t>ti \quad \text{equation}(16)$$

In an embodiment of the present disclosure, $t_i$ and $a_{ti}$ are the i-th timestamp and its corresponding action label, $y'_{t, ati}$ is the predicted probability that frame $x_t$ is assigned to action class $a_{ti}$, and $T=2(t_N-t_1)$ is the number of frames contributing to the loss. Further, $L_{conf}$ represents the confident loss. Further, the activity segmentation loss $L_{seg}$ and label generation loss $L_{graph}$ respectively for training the video segmentation-based ML model and the label prediction-based graph convolutional network model are written as:

$$L_{seg}=L_{class}+\alpha L_{smooth}+\beta L_{conf} \quad \text{equation (17)}$$

$$L_{graph}=L_{class}+\alpha L_{smooth} \quad \text{equation (18)}$$

In an embodiment of the present disclosure, $L_{seg}$ represents the activity segmentation loss and $L_{graph}$ represents the label generation loss. Further, $\alpha$ and $\beta$ are balancing parameters.

Figure 3A:
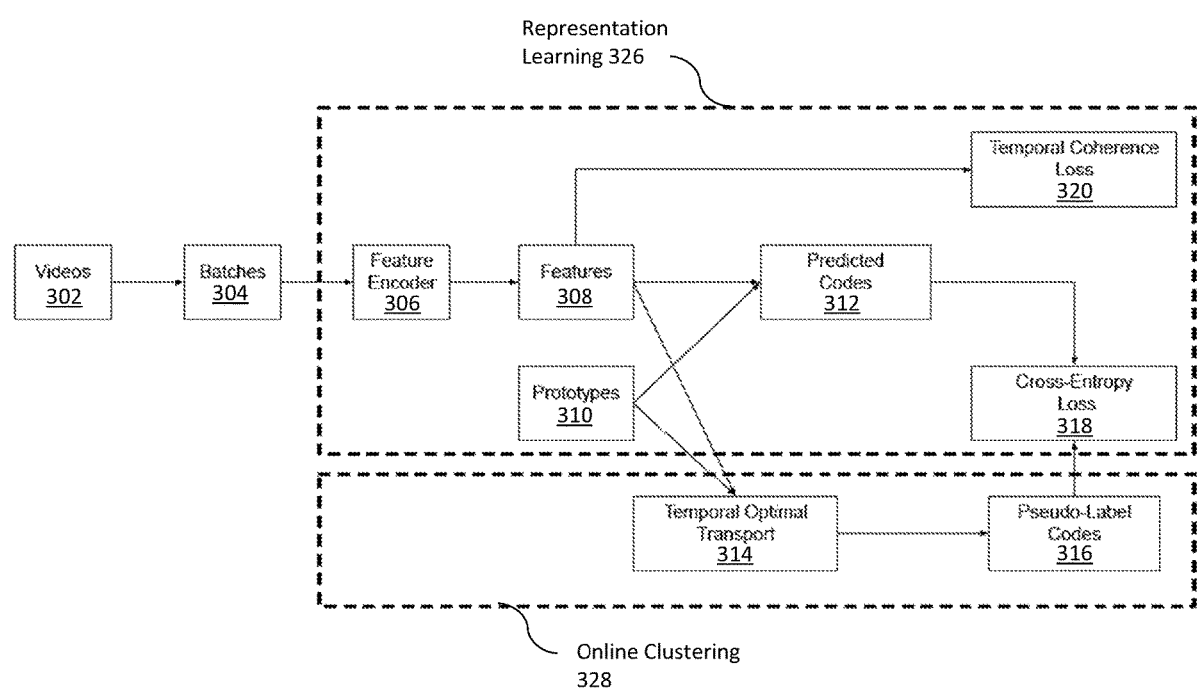
FIG. 3A-3B are block diagrams illustrating exemplary operation of the computing system for determining sub-activities in the videos and segmenting the videos, in accordance with an embodiment of the present disclosure.
Figure 3B:
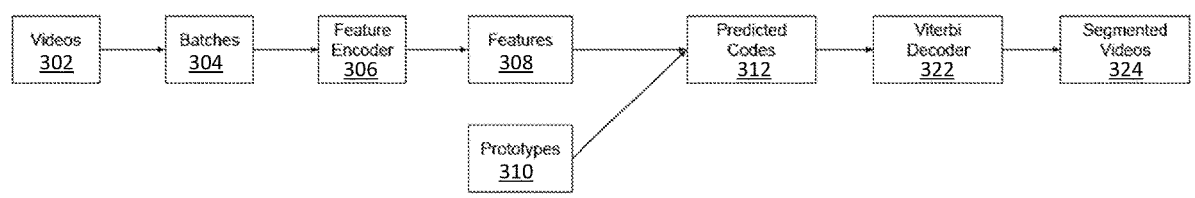

FIG. 3A—3B are block diagrams illustrating an exemplary operation of the computing system 104 for determining sub-activities in the videos and segmenting the videos, in accordance with an embodiment of the present disclosure. In an embodiment of the present disclosure, 302 represents a set of unlabelled videos capturing a complex human activity, such as a worker is assembling a car door in an automobile factory. 302 is labelled as 'videos' in FIG. 3A and FIG. 3B. Further, the one or more batches 304 are extracted from the set of unlabeled videos 302. 304 is labelled as 'batches' in the figures. In an embodiment of the present disclosure, each of the one or more batches 304 includes a set of frames. The activity determination-based ML model 306 extracts the one or more features 308 from the set of frames. 306 is labelled as 'feature encoder' and 308 is labelled as 'features' in the figures. Furthermore, the set of learned prototypes 310 representing cluster centres, with each prototype corresponding to a cluster centre and each cluster corresponding a sub-activity. 310 is labelled as 'prototypes' in the figures. In an embodiment of the present disclosure, the set of predicted codes 312 associate frames with clusters by using the one or more features 308 and the set of learned prototypes 310. 312 is labelled as 'predicted codes' in the figures. Further, the temporal optimal transport 314 computes the set of pseudo-label codes 316 by using the one or more features 308 and the set of learned prototypes 310. 316 is labelled as pseudo-label codes 316. In an embodiment of the present disclosure, the set of pseudo-label codes 316 act as ground truth associations between frames and clusters. Furthermore, the cross-entropy loss 318 is applied on the set of predicted codes 312 and the set of pseudo-label codes 316 for learning the one or more parameters of the activity determination-based ML model 306 and the set of learned prototypes 310. The temporal coherence loss 320 facilitates temporally close frames to be mapped to spatially nearby points in the embedding space and vice versa for learning the one or more parameters of the activity determination-based ML model 306. Further, a Viterbi decoder 322 generates one or more segmented videos 324 based on the categorized set of frames, the determined final loss, and the set of predicted codes 312. In an embodiment of the present disclosure, the Viterbi decoder 322 corresponds to the activity determination-based ML model 306. In an embodiment of the present disclosure, each of the one or more segmented videos 324 corresponds to grouping of frames associated with same sub-activity in the one or more videos into one cluster. In an embodiment of the present disclosure, 326 represents representational learning and 328 represents online clustering performed by the computing system 104. Further, 302-320 represent the computing system 104 during the training phase. Furthermore, 302-312 and 322-324 represent the computing system 104 during the testing phase.

In an embodiment of the present disclosure, during the training phase, the one or more data batches are sampled from the set of unlabelled videos 302. For a specific data batch, the one or more features 308 are obtained with the help of the activity determination-based ML model 306. The one or more features 308 are combined with the set of learned prototypes 310 to generate the set of predicted codes 312. Further, the one or more features 308 and the set of learned prototypes 310 are also fed to the temporal optimal transport 314 to compute the set of pseudo-label codes 316. Furthermore, the one or more parameters and the set of learned prototypes 310 are learned by applying the cross-entropy loss 318 on the set of predicted codes 312 and the set of pseudo-label codes 316, and the temporal coherence loss 320 on the one or more features 308. Further, during the testing phase, the set of unlabelled videos 302 are break into the one or more batches 304. For a specific data batch, the one or more features 308 are obtained with the help of the activity determination-based ML model 306. The one or more features 308 are combined with the set of learned prototypes 310 to generate the set of predicted codes 312. Further, the Viterbi decoder 322 takes the set of predicted codes 312 as input and generates the one or more segmented videos 324.

Figure 4A:
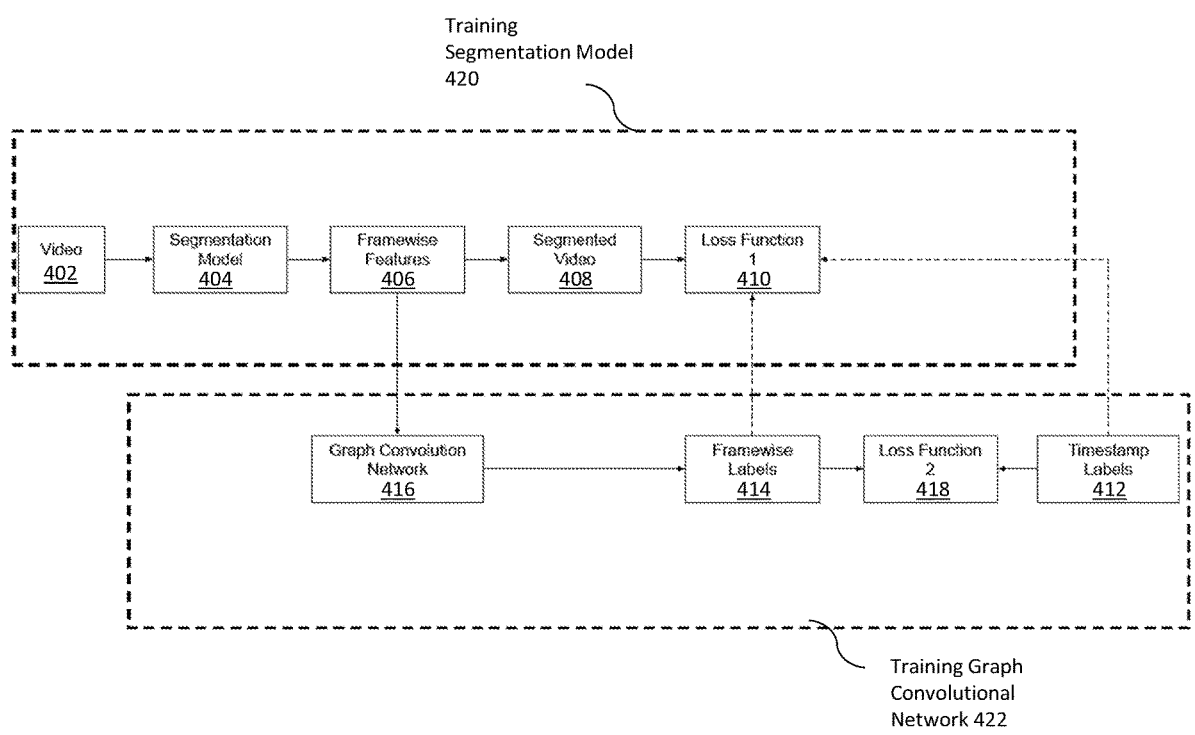
FIG. 4A-4B are block diagrams illustrating exemplary operation of the computing system for determining sub-activities in the videos and segmenting the videos, in accordance with another embodiment of the present disclosure.
Figure 4B:
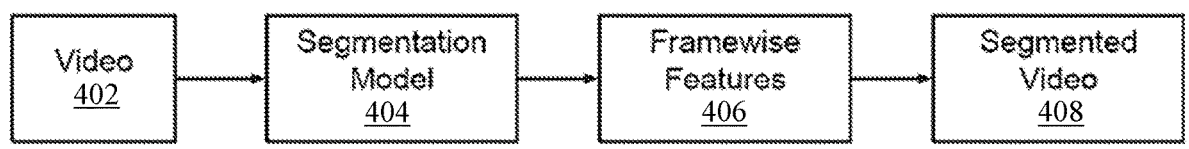

FIG. 4A—4B are block diagrams illustrating exemplary operation of the computing system 104 for determining sub-activities in the videos and segmenting the videos, in accordance with another embodiment of the present disclosure. In an embodiment of the present disclosure, the one or more videos 402 captures a complex human activity. 402 is labelled as 'video' in the figures. Further, the video segmentation-based ML model 404 extracts the one or more framewise features 406 from the one or more videos 402. 404 is labelled as 'segmentation model' and the 406 is labelled as 'framewise features' in the figures. Furthermore, a set of sub-activity classes are predicted for generating the one or more segmented videos 408 by using the video segmentation-based ML model 404. 408 is labelled as 'segmented video' in the figures. Furthermore, a loss function-1 410 is used for training the video segmentation-based ML model 404 by using the one or more sparse timestamp labels 412 or the one or more dense framewise labels 414 as supervision signals. 412 is labelled as 'timestamp labels' and the 414 is labelled as 'framewise labels' in the figures. The label prediction-based graph convolutional network model 416 determines the one or more dense framewise labels 414 by using the one or more features. 416 is labelled as 'graph convolution network'. In an embodiment of the present disclosure, the one or more dense framewise labels 414 corresponds to a set of sub-activity classes predicted for the one or more framewise features 406 by using the label prediction-based graph convolutional network model 416. Further, a loss function-2 418 trains the label prediction-based graph convolutional network model 416 by using the one or more sparse timestamp labels 412 as supervision signals. In an embodiment of the present disclosure, the one or more sparse timestamp labels 412 corresponds to a small set of sub-activity labels provided for a small number of frames in the one or more videos 402. In an embodiment of the present disclosure, 420 represents training of the video segmentation-based ML model 404 and 422 represents training of the label prediction-based graph convolutional network model 416. Further, 402-408 represent testing of the computing system 104.

In an embodiment of the present disclosure, the training phase is divided into two stages, i.e., initialization and refinement. During the initialization stage, the video segmentation-based ML model 404 is trained with the one or more sparse timestamp labels 412 as supervision signals for p epochs. In the refinement stage, q iterations of alternating learning are performed. For each iteration, the label prediction-based graph convolutional network model 416 is trained for m-epochs, and the one or more framewise features 406 from the video segmentation-based ML model 404 are input, the one or more sparse timestamp labels 412 are supervision signals, and the one or more dense framewise labels 414 are output. Further, the video segmentation-based ML 404 model is trained for n epochs, where the one or more dense framewise labels 414 from the label prediction-based graph convolutional network model 416 are supervision signals. During the testing phase, the label prediction-based graph convolutional network model 416 is discarded, and the video segmentation-based ML model 404 is used to produce the segmentation result.

Figure 5:
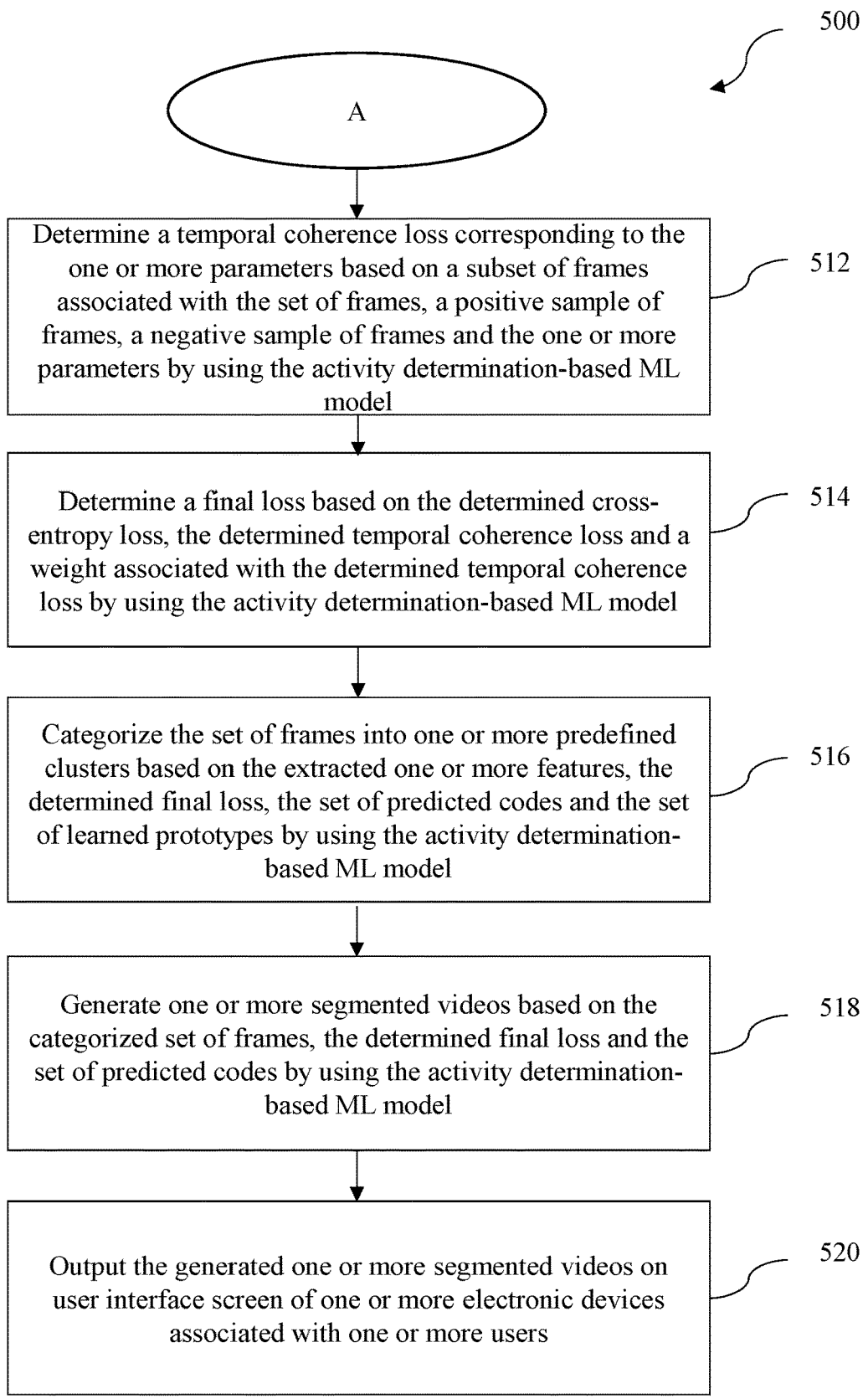
FIG. 5 is a process flow diagram illustrating an exemplary method for determining sub-activities in the videos and segmenting the videos, in accordance with an embodiment of the present disclosure.

FIG. 5 is a process flow diagram illustrating an exemplary method 500 for determining sub-activities in the videos and segmenting the videos, in accordance with an embodiment of the present disclosure. At step 502, one or more videos are received from one or more sources 102 for segmenting the one or more videos. In an embodiment of the present disclosure, the one or more videos are unlabeled videos including one or more activities performed by a human. The one or more activities may be complex human activities. For example, the one or more activities may be a worker assembling a car door in an automobile factory, a nurse performing a FAST procedure on a patient in a hospital and the like. In an exemplary embodiment of the present disclosure, the one or more sources 102 may be one or more image capturing devices, one or more electronic devices 108 and the like. In an embodiment of the present disclosure, the one or more sources 102 may capture the one or more videos, store the one or more videos and the like. In an exemplary embodiment of the present disclosure, the one or more electronic devices 108 may include a laptop computer, desktop computer, tablet computer, smartphone, wearable device, smart watch and the like.

At step 504, one or more batches are extracted from the received one or more videos by using a batch extraction technique. For example, each batch contains 64 frames collected from two videos. In an embodiment of the present disclosure, each of the one or more batches includes a set of frames.

At step 506, one or more features are extracted from the set of frames associated with each of the one or more batches by using an activity determination-based ML model. For example, the activity determination-based ML model is a deep neural network. In an embodiment of the present disclosure, the one or more features include one or more geometric features and one or more semantic features. For example, the one or more geometric features include edges, corners extracted the set of frames and the like. Further, the one or more semantic features include object classes, object poses extracted from the set of frames and the like.

At step 508, a set of predicted codes are generated based on the extracted one or more features, a temperature parameter, and a set of learned prototypes by using the activity determination-based ML model. In an embodiment of the present disclosure, each of the set of learned prototypes corresponds to a cluster center. In an embodiment of the present disclosure, each of the cluster centre corresponds to a sub-activity. In generating the set of predicted codes based on the extracted one or more features, the temperature parameter, and the set of learned prototypes by using the activity determination-based ML model, the method 500 includes correlating the extracted one or more features, the temperature parameter, and the set of learned prototypes with each other by using the activity determination-based ML model. Further, the method 500 includes generating the set of predicted codes based on result of correlation. In an embodiment of the present disclosure, the set of predicted codes facilitates in associating the set of frames with the one or more predefined clusters. Further, the set of predicted codes with each entry are computed as:

$$P_{ij} = \exp(1/\tau z_i^t c_j) / \Sigma_{j'=1}^K \exp(1/\tau z_i^T c_{j'}) \quad \text{equation(1)}$$

In an embodiment of the present disclosure, $P_{ij}$ represents probability that an i-th frame/feature $z_i$ is assigned to a j-th cluster/prototype $c_j$, P represents the set of predicted codes (predicted assignment probabilities between frames/features and clusters/prototypes) and $\tau$ represents the temperature parameter. K is the number of clusters/prototypes in an activity.

At step 510, a cross-entropy loss is determined corresponding to one or more parameters associated with the activity determination-based ML model and the set of learned prototypes based on the generated set of predicted codes and a set of pseudo-label codes by using the activity determination-based ML model. Further, for clustering-based representation learning, the cross-entropy loss is minimized with respect to the one or more parameters and the set of learned prototypes:

$$L_{CE} = -1/B \Sigma_{i=1}^B \Sigma_{j=1}^K Q_{ij} \log P_{ij} \quad \text{equation(2)}$$

Furthermore, Q represents the set of pseudo-label codes (pseudo-label assignment probabilities between frames/features and clusters/prototypes) and $L_{CE}$ represents the cross-entropy loss. B is the number of frames/features in a data batch.

In an embodiment of the present disclosure, the method 500 includes determining a probability for mapping each of the extracted one or more features with the set of learned prototypes. Further, the method 500 includes determining a similarity between the extracted one or more features and the set of learned protypes by using a temporal optimal transport problem. In an embodiment of the present disclosure, the temporal optimal transport problem exploits temporal information in the one or more videos. method 500 includes generating the set of pseudo-label codes by using the temporal optimal transport problem. Furthermore, the method 500 includes generating the set of pseudo-label codes based on the extracted one or more features, the set of learned prototypes, the determined similarity, and the temporal prior by using the activity determination-based ML model. In an embodiment of the present disclosure, the set of pseudo-label codes acts as a ground truth associations between the set of frames and the one or more predefined clusters. Further, the set of pseudo-label codes are computed by solving the temporal optimal transport problem by using a predefined data batch at a time.

At step 512, a temporal coherence loss is determined corresponding to the one or more parameters based on a subset of frames associated with the set of frames, a positive sample of frames, a negative sample of frames and the one or more parameters by using the activity determination-based ML model upon determining the temporal coherence loss. In an embodiment of the present disclosure, the temporal coherence loss is a self-supervised loss which exploits temporal information in the one or more videos. The temporal coherence loss learns an embedding space following temporal coherence constraints, where temporally close frames may be mapped with nearby points and temporally distant frames should be mapped with far away points. To enable fast convergence and effective representations, N-pair metric learning loss is employed.

Further, the temporal coherence loss is minimized with respect to the one or more parameters:

$$L_{TC} = -1/N \Sigma_{i=1}^N \log[\exp(z_i^T z_i^+)/(\exp(z_i^T z_i^+) + \Sigma_{j \neq i}^N \exp(z_i^T z_j^+))] \quad \text{equation(3)}$$

In an embodiment of the present disclosure, $L_{TC}$ represents the temporal coherence loss. Further, for each of the one or more videos, a subset of N ordered frames are sampled and denoted by $\{z_i\}$, with $i \in \{1, 2, \ldots, N\}$. For each $z_i$, a "positive" example $z_i^+$ is sampled inside a temporal window of $\lambda$ from $z_i$. Moreover, $z_j^+$ sampled for $z_j$ (with j≠i) is considered as a "negative" example for $z_i$.

At step 514, a final loss is determined based on the determined cross-entropy loss, the determined temporal coherence loss and a weight associated with the determined temporal coherence loss by using the activity determination-based ML model. In an embodiment of the present disclosure, the final loss is optimized corresponding to the one or more parameters and the set of learned prototypes. In an embodiment of the present disclosure, the final loss for learning self-supervised representations for unsupervised activity segmentation is a combination of the determined cross-entropy loss and the determined temporal coherence loss:

$$L = L_{CE} + \alpha L_{TC} \quad \text{equation(4)}$$

In an embodiment of the present disclosure, α represents the weight for the temporal coherence loss and L represents the final loss. In an embodiment of the present disclosure, the final loss is optimized with respect to the one or more parameters and the set of learned prototypes. The cross-entropy loss and the temporal coherence loss are differentiable and may be optimized using backpropagation. In an embodiment of the present disclosure, the set of pseudo-label codes are not used for propagation. Furthermore, the focus is on exploiting temporal/frame-level cues in videos, this approach can easily be extended to include additional losses for exploiting additional cues such as spatial cues, action-level cues, and alignment cues.

In an embodiment of the present disclosure, an online clustering module is used for computing the set of pseudo-label codes online. In an embodiment of the present disclosure, after extracting the one or more features from the set of frames, the set of pseudo-label codes are computed with each entry $Q_{ij}$ representing probability that features $z_i$ may be mapped to the prototype $c_j$. In an embodiment of the present disclosure, the set of pseudo-label codes are computed by solving the optimal transport problem:

$$\max_{Q \in Q} Tr(Q^T Z C^T) + \varepsilon H(Q) \quad \text{equation(5)}$$

$$Q = \{Q \in R_+^{B \times K} : Q1_K = 1/B 1_B, Q1_B = 1/K 1_K\} \quad \text{equation(6)}$$

In an embodiment of the present disclosure, Q represents the set of pseudo-label codes, Tr( ) represents the trace( ) operator, Z represents the set of frame features and C represents the set of learned prototypes. Further, $1_B$ and $1_K$ denote vectors of ones in dimensions B and K respectively. In equation (5), the first term i.e., Tr ($Q^T Z C^T$) measures the similarity between the one or more features and the set if learned prototypes, while the second term i.e., $H(Q) = -\Sigma^B_{i=1} \Sigma^K_{j=1} Q_{ij} \log Q_{ij}$) measures entropy regularization of the set of pseudo-label codes and is the weight for the entropy term. A large value of E usually leads to a trivial solution where every frame has the same probability of being assigned to every cluster. Thus, a small value of E is used in experiments to avoid the above trivial solution. Furthermore, equation (6) represents equal partition constraints, which enforce that each cluster is assigned the same number of frames in a batch, thus preventing a trivial solution where all frames are assigned to a single cluster.

Further, α temporal regularization term is incorporated which preserves the temporal order of the activity into the optimal transport objective in equation (5), yielding the temporal optimal transport. Furthermore, a prior distribution for Q, namely:

$$T \in R_+^{B \times K} \quad \text{equation(7)}$$

In an embodiment of the present disclosure, the highest values appear on the diagonal and the values gradually decrease along the direction perpendicular to the diagonal. Specifically, T maintains a fixed temporal order of the clusters and enforces initial frames to be assigned to initial clusters and later frames to be assigned to later clusters. Mathematically, T may be represented by a 2D distribution, whose marginal distribution along any line perpendicular to the diagonal is a Gaussian distribution centered at the intersection on the diagonal, as:

$$T_{ij} = 1/(\sigma \operatorname{sqrt}(2\pi)) \exp(-d^2(i,j)/(2\sigma^2)), d(i,j) = |i/B - j/K|/\operatorname{sqrt}(1/B^2 + 1/K^2) \quad \text{equation(8)}$$

In an embodiment of the present disclosure, with d(i,j) measuring the distance from the entry (i,j) to the diagonal line. To encourage the distribution of values of the set of pseudo-label codes to be as similar as possible to the above prior distribution T, the optimal transport objective in the equation (5) is replaced with the following temporal optimal transport objective:

$$\max_{Q \in Q} Tr(Q^T Z C^T) - \rho KL(Q \| T) \quad \text{equation(9)}$$

$$KL(Q \| T) = \Sigma_{i=1}^B \Sigma_{j=1}^K Q_{ij} \log(Q_{ij} / T_{ij}) \quad \text{equation(10)}$$

In an embodiment of the present disclosure, equation (10) is the Kullback-Leibler (KL) divergence between 'Q' and 'T', and 'ρ' is the weight for the KL term. Furthermore, so far, the focus is on exploiting the above fixed temporal order prior T (also called temporal order-preserving prior), the approach can easily be extended to handle order variations (e.g., by using a combination of the fixed temporal order prior and the optimality prior), and background or redundant frames (e.g., by adding a virtual cluster for background/redundant frames).

At step 516, the set of frames are categorized into one or more predefined clusters based on the extracted one or more features, the determined final loss, the set of predicted codes and the set of learned prototypes by using the activity determination-based ML model. In an embodiment of the present disclosure, each of the one or more predefined clusters corresponds to a sub-activity.

At step 518, one or more segmented videos are generated based on the categorized set of frames, the determined final loss and the set of predicted codes by using the activity determination-based ML model. In an embodiment of the present disclosure, each of the one or more segmented videos corresponds to grouping of frames associated with same sub-activity in the one or more videos into one cluster. In an embodiment of the present disclosure, the activity determination-based ML model is an unsupervised activity segmentation model which requires only unlabeled videos i.e., without annotation to generate the one or more segmented videos.

At step 520, the generated one or more segmented videos are outputted on user interface screen of the one or more electronic devices 108 associated with the one or more users.

The method 500 includes application of the cross-entropy loss on the set of predicted codes and the generated set of pseudo-label codes for learning the one or more parameters of the activity determination-based ML model and the set of learned prototypes upon generating the set of pseudo-label codes. Further, the method 500 includes mapping a set of temporally close frames associated with the categorized set of frames to spatially nearby points in an embedding space and a set of temporally distant frames associated with the categorized set of frame to distant points in the embedding space by using the temporal coherence loss for learning the one or more parameters of the activity determination-based ML model.

In an embodiment of the present disclosure, the method 500 includes extracting one or more framewise features from the received one or more videos by using a video segmentation-based ML model. In an embodiment of the present disclosure, the one or more framewise features comprise one or more geometric features and one or more semantic features. In an exemplary embodiment of the present disclosure, the video segmentation-based ML model is a deep neural network model. Further, the method 500 includes predicting one or more sub-activity classes for the received one or more videos based on the extracted one or more framewise features by using the video segmentation-based ML model. The method 500 includes generating the one or more segmented videos based on the predicted one or more sub activity classes by using the video segmentation-based ML model.

Further, the method 500 includes receiving one or more sparse timestamp labels for one or more frames associated with the one or more videos from the one or more users. Further, the method 500 includes training a label prediction-based graph convolutional network model based on the extracted one or more framewise features, the received one or more sparse timestamp labels as supervision signals, a label generation loss and one or more propagation rules. In an embodiment of the present disclosure, the one or more propagation rules correspond to equation (11). The method 500 includes generating one or more dense framewise labels based on the extracted one or more framewise features and the received one or more sparse timestamp labels by using the label prediction-based graph convolutional network model. The generated one or more dense framewise labels correspond to the one or more sub-activity classes predicted for the one or more framewise features. Furthermore, the method 500 includes training the video segmentation-based ML model by using an activity segmentation loss, and the received one or more sparse timestamp labels or the generated one or more dense framewise labels as supervision signals. In an embodiment of the present disclosure, the label prediction-based graph convolutional network model is learned in an end-to-end manner to exploit not only frame features but also connections between neighbouring frames. In an embodiment of the present disclosure, during training, the video segmentation-based ML model is initialized by training it with the one or more sparse timestamp labels i.e., initialization stage. Further, an alternating approach is used for training the label prediction-based graph convolutional network model, which takes framewise features from the video segmentation-based ML model as input, uses one or more sparse timestamp labels for supervision, and generates one or more dense framewise labels as output. Further, the alternating approach includes training the segmentation model, which uses the one or more dense framewise labels from the label prediction-based graph convolutional network model for supervision i.e., refinement stage. In an embodiment of the present disclosure, during testing, the label prediction-based graph convolutional network model is discarded while the video segmentation-based ML model is employed to provide segmentation results. In an exemplary embodiment of the present disclosure, the video segmentation-based ML model is multi-stage temporal convolutional network. Further, the label prediction-based graph convolutional network model is a two-layer graph convolutional network with below propagation rule:

$$H_{l+1} = \sigma(D'^{-1/2} A' D'^{-1/2} H_l W_l) \quad \text{equation(11)}$$

$$A' = A + I \quad \text{equation(12)}$$

In an embodiment of the present disclosure, A' is an adjacency matrix with added self-connections represented by an identity matrix I, while D' is the degree matrix of A'. Further, $W_l$, $\sigma$, and $H_l$ are the weight matrix, the activation function, and the activation matrix for the l-th layer respectively. In addition, the first layer maps input features i.e., 64-dimensional vectors to 32-dimensional vectors, which are subsequently passed through ReLU activation, a second layer, and lastly softmax classification. To construct a graph from an input video, frames are considered along with their features as nodes and we connect each frame with its preceding 15 frames and succeeding 15 frames i.e., yielding a temporal window size of 31, to form pairwise edges. Furthermore, the edge weight between nodes i and j are defined as cosine similarity between corresponding features $x_i$ and $x_j$ as:

$$A_{ij} = (x_i^T x_j)/(\|x_i\| \|x_j\|) \quad \text{equation(13)}$$

In an embodiment of the present disclosure, input features to the label prediction-based graph convolutional network model are the output of penultimate layer of the video segmentation-based ML model and are 64-dimensional vectors. The video segmentation-based ML model and the label prediction-based graph convolutional network model are learned via backpropagation respectively through determined losses.

In an embodiment of the present disclosure, the method 500 includes predicting a probability of assigning each of the set of frames to the predicted one or more sub-activity classes. Further, the method 500 includes determining a classification loss based on number of the set of frames, the predicted probability and the generated one or more dense framewise labels. The method 500 includes determining a smoothing loss based on number of the one or more sub-activity classes and a thresholding parameter upon determining the classification class. The method 500 includes determining a confident loss based on one or more timestamps associated with the set of frames, one or more action labels associated with the one or more timestamps, the predicted probability and number of frames contributing to loss upon determining the smoothing loss. Furthermore, the method 500 includes generating the label generation loss based on the determined classification loss, the determined smoothing loss and a smoothing weight associated with the determined smoothing loss. The method 500 includes generating the activity segmentation loss based on the determined classification loss, the determined smoothing loss, the determined confident loss, a confident weight associated with the determined confident loss and the smoothing weight. In an embodiment of the present disclosure, conventional combination of the classification loss and the smoothing loss for training the video segmentation-based ML model and the label prediction-based graph convolutional network model. Further, the confidence loss is used in the training of the video segmentation-based ML model to boost its performance.

In an embodiment of the present disclosure, the cross-entropy loss is applied between the predicted probabilities and the one or more action labels as:

$$L_{class} = 1/T \Sigma_t (-\log y'_{t,a}) \quad \text{equation(14)}$$

In an embodiment of the present disclosure, T represents the number of frames in the video, $L_{class}$ is the classification loss, and $y'_{t,a}$ represents the predicted probability that frame $x_t$ is assigned to action class 'a'. In an embodiment of the present disclosure, the smoothing loss is employed to tackle the problem of over-segmentation as:

$$L_{smooth} = 1/(TC) \Sigma_{t,a} (\Delta'_{t,a}{}^2), \Delta'_{t,a} = \Delta_{t,a}, \Delta_{t,a} \leq \tau,$$
$$\Delta'_{t,a} = \tau, \Delta_{t,a} > \tau, \Delta_{t,a} = |\log(y'_{t,a}) - \log(y'_{t-1,a})| \quad \text{equation(15)}$$

Further, C represents a number of action classes in the activity, $L_{smooth}$ is the smoothing loss and $\tau$ represents a thresholding parameter. In an embodiment of the present disclosure, the confidence loss is adopted to encourage the predicted probabilities to monotonically decrease as the distance to the timestamps increases:

$$L_{conf} = 1/T \Sigma_{ati \in ATS} (\Sigma_{t=ti-1}^{ti+1} \delta_{ati,t}), \delta_{ati,t} = \max(0, \log(y'_{t,ati}) - \log(y'_{t-1,ati})), t \leq t_i, \delta_{ati,t} = \max(0, \log(y't-1, ati) - \log(y't, ati)), t > ti \quad \text{equation(16)}$$

In an embodiment of the present disclosure, $t_i$ and $a_t i$ are the i-th timestamp and its corresponding action label, $y'_{t,ati}$ is the predicted probability that frame $x_t$ is assigned to action class $a_{ti}$, and $T = 2(t_N - t_1)$ is the number of frames contributing to the loss. Further, $L_{conf}$ represents the confident loss. Further, the activity segmentation loss $L_{seg}$ and label generation loss $L_{graph}$ respectively for training the video segmentation-based ML model and the label prediction-based graph convolutional network model are written as:

$$L_{seg} = L_{class} + \alpha L_{smooth} + \beta L_{conf} \quad \text{equation (17)}$$

$$L_{graph} = L_{class} + \alpha L_{smooth} \quad \text{equation (18)}$$

In an embodiment of the present disclosure, $L_{seg}$ represents the activity segmentation loss and $L_{graph}$ represents the label generation loss. Further, $\alpha$ and $\beta$ are balancing parameters.

The method 500 may be implemented in any suitable hardware, software, firmware, or combination thereof.

Thus, various embodiments of the present computing system 104 provide a solution to determine sub-activities in videos and segmenting the videos. The computing system 104 discovers sub-activities and temporally segments videos of a human activity with little to no annotation. In an embodiment of the present disclosure, the computing system 104 performs an unsupervised activity segmentation, which requires only unlabelled videos i.e., no annotation. The computing system 104 uses video frame clustering as a pretext task, and simultaneously performs representation learning and online clustering for unsupervised activity segmentation. Further, the computing system 104 performs weakly-supervised activity segmentation, which requires only sparse timestamp labels i.e., little annotation. Specifically, it learns the label prediction-based graph convolutional network model to generate the one or more dense framewise labels from the one or more sparse timestamp labels, and then uses the generated one or more dense framewise labels for training the video segmentation-based ML model. The main problem tackled by the computing system 104 is temporally segmenting videos capturing the human activity (also called temporal activity segmentation, temporal action segmentation or temporal video segmentation). Moreover, the computing system 104 may be used for solving the problem of automatically discovering sub-activities from videos capturing a human activity (also called action discovery, activity structure learning or task structure learning). In an embodiment of the present disclosure, the computing system 104 leverages video frame clustering as a pretext task, thus directly optimizing for the main task of unsupervised activity segmentation. To exploit temporal information in videos, a combination of temporal optimal transport and temporal coherence loss is used. The temporal optimal transport preserves the temporal order of the activity when computing the set of predicted codes, while the temporal coherence loss enforces temporally close frames to be mapped to nearby points in the embedding space and vice versa. Furthermore, the computing system 104 processes one data batch at a time in an online manner, leading to significantly less memory requirements. This is in contrast to current solutions, which often perform representation learning and clustering sequentially, while storing embedded features for the entire dataset before clustering them in an offline manner. In an embodiment of the present disclosure, to learn self-supervised representations for unsupervised activity segmentation, the computing system 104 uses video frame clustering as the pretext task. Thus, the learned features are explicitly optimized for the main task of unsupervised activity segmentation. The computing system 104 may be used for exploiting the fixed temporal order prior (also called temporal order-preserving prior), order variations, such as by using a combination of the fixed temporal order prior and the optimality prior, and background/redundant frames, such as by adding a virtual cluster for background or redundant frames. In an embodiment of the present disclosure, the computing system 104 may be used to exploit temporal or frame-level cues in videos. The computing system 104 may also be used in case of additional losses for exploiting additional cues such as spatial cues, action-level cues, and alignment cues.

Further, the computing system 104 may be applied to any applications which involve the understanding of complex human activities, and where visual sensors, other sensors, such as depth sensors or a combination thereof are available. In an embodiment of the present disclosure, the invention may be utilized to provide analytics for a repetitive manual activity. For this application, one or more cameras may be installed to observe the activity, such as on one or more workstations on a factory floor, a warehouse, or a surgical room. Further, a video dataset recorded through a camera may be used to train a machine learning model which may output a set of steps performed in the video alongside confidence scores in how robust those steps are across the dataset. The machine learning model may also return the video clips in the video dataset corresponding to the steps. This output data may be analysed to provide time and motion studies, such as cycle-time calculations and step-level analytics such as variability analysis to a user, such as an industrial engineer or a health-and-safety inspector. These video clips can also be used to train a video classification machine learning model, which may in turn be used to detect missed steps and other mistakes in a similar activity observed in real-time through the camera. The worker performing the activity may be warned in real-time or a performance report generated for offline use, or a training manual may be created from these observations. In addition, the computing system 104 may be used to assess compliance to standards established for a certain activity, such as an assembly process on the factory floor. The computing system 104 may be used to monitor and understand not only human-powered work, but also automation such as robots and other machinery. The computing system 104 may also be used to generate proposal for improve the observed process itself Furthermore, the computing system 104 may be used to help hospitals and medical systems standardize and compare surgical procedures performed under different systems and by different surgeons. The computing system 104 may be embedded into an augmented reality or virtual reality device, such that it may automatically understand the current activity or intention of the user, and guide or help the user through the activity. The computing system 104 may be embedded into smart camera systems including surveillance systems to automatically detect important steps in an activity and change capturing parameters based on the phase of the activity. The computing system 104 may be embedded into Collaborative Robots (Cobots) that work with humans to understand an activity through demonstration and repeat or improve it. Further, the computing system 104 does not require human supervision for training in the form of labels that explicitly define each step of the activity in the form of time series labels. The computing system 104 discovers such steps from a video dataset of manual processes without requiring human supervision.

Furthermore, the computing system 104 discloses a weakly-supervised activity segmentation approach which learns a graph convolutional network to convert the provided sparse timestamp labels to dense framewise labels, and then uses the generated dense framewise labels for training the segmentation model. The graph convolutional network is learned in an end-to-end manner to exploit not only frame features but also connections between neighbouring frames. This is in contrast to current solutions, which detect action boundaries by minimizing distances between frame features and action centres to generate dense framewise labels. Further, the computing system 104 also includes an alternating learning framework for training the video segmentation based ML model and the label prediction-based graph convolutional network model. The computing system 104 may be easily extended to include additional losses for improving the performance such as deep supervision losses and self-supervised losses. Further, the label prediction-based graph convolutional network model converts the provided sparse timestamp labels to dense framewise labels.

In an embodiment of the present disclosure, the conventional approaches generally separate representation learning from clustering, and require storing learned features for the whole dataset before clustering them in an offline manner. In contrast, the computing system 104 combines representation learning and clustering into a single joint framework, while processing one mini-batch at a time in an online manner. Thus, the computing system 104 achieves better results, while having substantially less memory requirement. The computing system 104 employs optimal transport for clustering, while. Further, for representation learning, the computing system 104 employs clustering-based loss.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A computing system for determining sub-activities in videos and segmenting the videos, the computing system comprising:
   one or more hardware processors; and
   a memory coupled to the one or more hardware processors, wherein the memory comprises a plurality of modules in the form of programmable instructions executable by the one or more hardware processors, and wherein the plurality of modules comprises:
   a data receiver module configured to receive one or more videos from one or more sources for segmenting the one or more videos, wherein the one or more videos are unlabeled videos comprising one or more activities performed by a human;

a batch extraction module configured to extract one or more batches from the received one or more videos by using a batch extraction technique, wherein each of the one or more batches comprises a set of frames;

a feature extraction module configured to extract one or more features from the set of frames associated with each of the one or more batches by using an activity determination-based Machine Learning (ML) model;

a predicted code generation module configured to generate a set of predicted codes based on the extracted one or more features, a temperature parameter, and a set of learned prototypes by using the activity determination-based ML model, wherein each of the set of learned prototypes corresponds to a cluster center;

a cross-entropy loss determination module configured to determine a cross-entropy loss corresponding to one or more parameters associated with the activity determination-based ML model and the set of learned prototypes based on the generated set of predicted codes and a set of pseudo-label codes by using the activity determination-based ML model;

a temporal coherence loss determination module configured to determine a temporal coherence loss corresponding to the one or more parameters based on a subset of frames associated with the set of frames, a positive sample of frames, a negative sample of frames and the one or more parameters by using the activity determination-based ML model upon determining the temporal coherence loss;

a loss determination module configured to determine a final loss based on the determined cross-entropy loss, the determined temporal coherence loss and a weight associated with the determined temporal coherence loss by using the activity determination-based ML model, wherein the final loss is optimized corresponding to the one or more parameters and the set of learned prototypes;

a data categorization module configured to categorize the set of frames into one or more predefined clusters based on the extracted one or more features, the determined final loss, the set of predicted codes and the set of learned prototypes by using the activity determination-based ML model, wherein each of the one or more predefined clusters corresponds to a sub-activity;

a data generation module configured to generate one or more segmented videos based on the categorized set of frames, the determined final loss and the set of predicted codes by using the activity determination-based ML model; and a data output module configured to output the generated one or more segmented videos on user interface screen of one or more electronic devices associated with one or more users.

2. The computing system of claim 1, wherein the one or more features comprise one or more geometric features and one or more semantic features, wherein the one or more geometric features comprise edges and corners extracted the set of frames, and wherein the one or more semantic features comprise object classes and object poses extracted from the set of frames.

3. The computing system of claim 2, further comprising a pseudo-label code generation module configured to:

determine a probability for mapping each of the extracted one or more features with the set of learned prototypes;

determine a similarity between the extracted one or more features and the set of learned protypes by using a temporal optimal transport problem;

generate the set of pseudo-label codes by using the temporal optimal transport problem; and generate the set of pseudo-label codes based on the extracted one or more features, the set of learned prototypes, the determined similarity, and the temporal prior by using the activity determination-based ML model, wherein the set of pseudo-label codes act as a ground truth associations between the set of frames and the one or more predefined clusters.

4. The computing system of claim 3, further comprising a training module configured to:

apply the cross-entropy loss on the set of predicted codes and the generated set of pseudo-label codes for learning the one or more parameters of the activity determination-based ML model and the set of learned prototypes upon generating the set of pseudo-label codes; and map a set of temporally close frames associated with the categorized set of frames to spatially nearby points in an embedding space and a set of temporally distant frames associated with the categorized set of frame to distant points in the embedding space by using the temporal coherence loss for learning the one or more parameters of the activity determination-based ML model.

5. The computing system of claim 1, wherein each of the one or more segmented videos corresponds to grouping of frames associated with same sub-activity in the one or more videos into one cluster.

6. The computing system of claim 1, wherein in generating the set of predicted codes based on the extracted one or more features, the temperature parameter, and the set of learned prototypes by using the activity determination-based ML model, the predicted code generation module is configured to:

correlate the extracted one or more features, the temperature parameter, and the set of learned prototypes with each other by using the activity determination-based ML model; and generate the set of predicted codes based on result of correlation.

7. The computing system of claim 1, further comprising an activity segmentation module configured to:

extract one or more framewise features from the received one or more videos by using a video segmentation-based ML model, wherein the one or more framewise features comprise one or more geometric features and one or more semantic features;

predict one or more sub-activity classes for the received one or more videos based on the extracted one or more framewise features by using the video segmentation-based ML model; and generate the one or more segmented videos based on the predicted one or more sub activity classes by using the video segmentation-based ML model.

8. The computing system of claim 7, wherein the training module is configured to:

receive one or more sparse timestamp labels for one or more frames associated with the one or more videos from the one or more users;

train a label prediction-based graph convolutional network model based on the extracted one or more framewise features, the received one or more sparse timestamp labels as supervision signals, a label generation loss and one or more propagation rules;
generate one or more dense framewise labels based on the extracted one or more framewise features and the received one or more sparse timestamp labels by using the label prediction-based graph convolutional network model, wherein the generated one or more dense framewise labels correspond to the one or more sub-activity classes predicted for the one or more framewise features; and
train the video segmentation-based ML model by using an activity segmentation loss and one of: the received one or more sparse timestamp labels and the generated one or more dense framewise labels as supervision signals.

9. The computing system of claim 8, wherein the loss determination module is configured to:
predict a probability of assigning each of the set of frames to the predicted one or more sub-activity classes;
determine a classification loss based on number of the set of frames, the predicted probability and the generated one or more dense framewise labels;
determine a smoothing loss based on number of the one or more sub-activity classes and a thresholding parameter upon determining the classification class;
determine a confident loss based on one or more timestamps associated with the set of frames, one or more action labels associated with the one or more timestamps, the predicted probability and number of frames contributing to loss upon determining the smoothing loss;
generate the label generation loss based on the determined classification loss, the determined smoothing loss and a smoothing weight associated with the determined smoothing loss; and
generate the activity segmentation loss based on the determined classification loss, the determined smoothing loss, the determined confident loss, a confident weight associated with the determined confident loss and the smoothing weight.

10. A method for determining sub-activities in videos and segmenting the videos, the method comprising:
receiving, by one or more hardware processors, one or more videos from one or more sources for segmenting the one or more videos, wherein the one or more videos are unlabeled videos comprising one or more activities performed by a human;
extracting, by the one or more hardware processors, one or more batches from the received one or more videos by using a batch extraction technique, wherein each of the one or more batches comprises a set of frames;
extracting, by the one or more hardware processors, one or more features from the set of frames associated with each of the one or more batches by using an activity determination-based Machine Learning (ML) model;
generating, by the one or more hardware processors, a set of predicted codes based on the extracted one or more features, a temperature parameter, and a set of learned prototypes by using the activity determination-based ML model, wherein each of the set of learned prototypes corresponds to a cluster center;
determining, by the one or more hardware processors, a cross-entropy loss corresponding to one or more parameters associated with the activity determination-based ML model and the set of learned prototypes based on the generated set of predicted codes and a set of pseudo-label codes by using the activity determination-based ML model;
determining, by the one or more hardware processors, a temporal coherence loss corresponding to the one or more parameters based on a subset of frames associated with the set of frames, a positive sample of frames, a negative sample of frames and the one or more parameters by using the activity determination-based ML model upon determining the temporal coherence loss;
determining, by the one or more hardware processors, a final loss based on the determined cross-entropy loss, the determined temporal coherence loss and a weight associated with the determined temporal coherence loss by using the activity determination-based ML model, wherein the final loss is optimized corresponding to the one or more parameters and the set of learned prototypes;
categorizing, by the one or more hardware processors, the set of frames into one or more predefined clusters based on the extracted one or more features, the determined final loss, the set of predicted codes and the set of learned prototypes by using the activity determination-based ML model, wherein each of the one or more predefined clusters corresponds to a sub-activity;
generating, by the one or more hardware processors, one or more segmented videos based on the categorized set of frames, the determined final loss and the set of predicted codes by using the activity determination-based ML model; and
outputting, by the one or more hardware processors, the generated one or more segmented videos on user interface screen of one or more electronic devices associated with one or more users.

11. The method of claim 10, wherein the one or more features comprise one or more geometric features and one or more semantic features, wherein the one or more geometric features comprise edges and corners extracted the set of frames, and wherein the one or more semantic features comprise object classes and object poses extracted from the set of frames.

12. The method of claim 11, further comprising:
determining a probability for mapping each of the extracted one or more features with the set of learned prototypes;
determining a similarity between the extracted one or more features and the set of learned protypes by using a temporal optimal transport problem;
generating the set of pseudo-label codes by using the temporal optimal transport problem; and
generating the set of pseudo-label codes based on the extracted one or more features, the set of learned prototypes, the determined similarity, and the temporal prior by using the activity determination-based ML model, wherein the set of pseudo-label codes acts as a ground truth associations between the set of frames and the one or more predefined clusters.

13. The method of claim 12, further comprising:
applying the cross-entropy loss on the set of predicted codes and the generated set of pseudo-label codes for learning the one or more parameters of the activity determination-based ML model and the set of learned prototypes upon generating the set of pseudo-label codes; and
mapping a set of temporally close frames associated with the categorized set of frames to spatially nearby points in an embedding space and a set of temporally distant frames associated with the categorized set of frame to distant points in the embedding space by using the temporal coherence loss for learning the one or more parameters of the activity determination-based ML model.

14. The method of claim 10, wherein each of the one or more segmented videos corresponds to grouping of frames associated with same sub-activity in the one or more videos into one cluster.

15. The method of claim 10, wherein generating the set of predicted codes based on the extracted one or more features, the temperature parameter, and the set of learned prototypes by using the activity determination-based ML model comprises:
correlating the extracted one or more features, the temperature parameter, and the set of learned prototypes with each other by using the activity determination-based ML model; and
generating the set of predicted codes based on result of correlation.

16. The method of claim 10, further comprising:
extracting one or more framewise features from the received one or more videos by using a video segmentation-based ML model, wherein the one or more framewise features comprise one or more geometric features and one or more semantic features;
predicting one or more sub-activity classes for the received one or more videos based on the extracted one or more framewise features by using the video segmentation-based ML model; and
generating the one or more segmented videos based on the predicted one or more sub activity classes by using the video segmentation-based ML model.

17. The method of claim 16, further comprising:
receiving one or more sparse timestamp labels for one or more frames associated with the one or more videos from the one or more users;
training a label prediction-based graph convolutional network model based on the extracted one or more framewise features, the received one or more sparse timestamp labels as supervision signals, a label generation loss and one or more propagation rules;
generating one or more dense framewise labels based on the extracted one or more framewise features and the received one or more sparse timestamp labels by using the label prediction-based graph convolutional network model, wherein the generated one or more dense framewise labels correspond to the one or more sub-activity classes predicted for the one or more framewise features; and
training the video segmentation-based ML model by using an activity segmentation loss and one of: the received one or more sparse timestamp labels and the generated one or more dense framewise labels as supervision signals.

18. The method of claim 17, further comprising:
predicting a probability of assigning each of the set of frames to the predicted one or more sub-activity classes;
determining a classification loss based on number of the set of frames, the predicted probability and the generated one or more dense framewise labels;
determining a smoothing loss based on number of the one or more sub-activity classes and a thresholding parameter upon determining the classification loss;
determining a confident loss based on one or more timestamps associated with the set of frames, one or more action labels associated with the one or more timestamps, the predicted probability and number of frames contributing to loss upon determining the smoothing loss;
generating the label generation loss based on the determined classification loss, the determined smoothing loss and a smoothing weight associated with the determined smoothing loss; and
generating the activity segmentation loss based on the determined classification loss, the determined smoothing loss, the determined confident loss, a confident weight associated with the determined confident loss and the smoothing weight.

19. A non-transitory computer-readable storage medium having instructions stored therein that, when executed by a hardware processor, cause the processor to perform method steps comprising:
receiving one or more videos from one or more sources for segmenting the one or more videos, wherein the one or more videos are unlabeled videos comprising one or more activities performed by a human;
extracting one or more batches from the received one or more videos by using a batch extraction technique, wherein each of the one or more batches comprises a set of frames;
extracting one or more features from the set of frames associated with each of the one or more batches by using an activity determination-based Machine Learning (ML) model;
generating a set of predicted codes based on the extracted one or more features, a temperature parameter, and a set of learned prototypes by using the activity determination-based ML model, wherein each of the set of learned prototypes corresponds to a cluster center;
determining a cross-entropy loss corresponding to one or more parameters associated with the activity determination-based ML model and the set of learned prototypes based on the generated set of predicted codes and a set of pseudo-label codes by using the activity determination-based ML model;
determining a temporal coherence loss corresponding to the one or more parameters based on a subset of frames associated with the set of frames, a positive sample of frames, a negative sample of frames and the one or more parameters by using the activity determination-based ML model upon determining the temporal coherence loss;
determining a final loss based on the determined cross-entropy loss, the determined temporal coherence loss and a weight associated with the determined temporal coherence loss by using the activity determination-based ML model, wherein the final loss is optimized corresponding to the one or more parameters and the set of learned prototypes;
categorizing the set of frames into one or more predefined clusters based on the extracted one or more features, the determined final loss, the set of predicted codes and the set of learned prototypes by using the activity determination-based ML model, wherein each of the one or more predefined clusters corresponds to a sub-activity;
generating one or more segmented videos based on the categorized set of frames, the determined final loss and the set of predicted codes by using the activity determination-based ML model; and
outputting the generated one or more segmented videos on user interface screen of one or more electronic devices associated with one or more users.

20. The non-transitory computer-readable storage medium of claim 19, wherein the one or more features comprise one or more geometric features and one or more semantic features, wherein the one or more geometric features comprise edges and corners extracted the set of frames, and wherein the one or more semantic features comprise object classes and object poses extracted from the set of frames.

* * * * *